United States Patent
Kusuda et al.

(10) Patent No.: US 8,619,028 B2
(45) Date of Patent: Dec. 31, 2013

(54) MOBILE COMMUNICATION TERMINAL, APPLICATION PROGRAM, IMAGE DISPLAY CONTROL APPARATUS, ELECTRONIC APPARATUS, AND IMAGE DISPLAY CONTROL METHOD

(75) Inventors: Hirohisa Kusuda, Tokyo (JP); Yasuhiro Nishide, Tokyo (JP); Daisuke Tsujino, Tokyo (JP); Jun Yamazaki, Tokyo (JP); Takashi Katayama, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 1388 days.

(21) Appl. No.: 11/632,749

(22) PCT Filed: Jul. 4, 2005

(86) PCT No.: PCT/JP2005/012316
§ 371 (c)(1),
(2), (4) Date: Jul. 25, 2007

(87) PCT Pub. No.: WO2006/008947
PCT Pub. Date: Jan. 26, 2006

(65) Prior Publication Data
US 2008/0014987 A1   Jan. 17, 2008

(30) Foreign Application Priority Data
Jul. 20, 2004 (JP) .................. 2004-211244

(51) Int. Cl.
*G06F 3/033* (2013.01)
*G09G 5/08* (2006.01)

(52) U.S. Cl.
USPC ........................................... 345/158

(58) Field of Classification Search
USPC ........ 345/156, 157, 184, 158; 463/31–33, 37, 463/38; 715/848, 850, 851, 856, 863; 455/566
See application file for complete search history.

(56) References Cited

U.S. PATENT DOCUMENTS

| | | | | |
|---|---|---|---|---|
| 4,527,155 | A * | 7/1985 | Yamaki et al. | 345/657 |
| 4,969,647 | A * | 11/1990 | Mical et al. | 463/31 |
| 6,201,554 | B1 * | 3/2001 | Lands | 345/169 |
| 6,466,198 | B1 * | 10/2002 | Feinstein | 345/158 |
| 6,556,185 | B2 * | 4/2003 | Rekimoto | 345/157 |
| 6,798,429 | B2 * | 9/2004 | Bradski | 345/156 |
| 7,351,152 | B2 * | 4/2008 | Abe et al. | 463/43 |
| 2003/0216176 | A1 | 11/2003 | Shimizu et al. | |
| 2005/0212911 | A1 * | 9/2005 | Marvit et al. | 348/154 |

FOREIGN PATENT DOCUMENTS

| | | |
|---|---|---|
| EP | 1 804 029 A2 | 7/2007 |
| GB | 2347593 A | 9/2000 |

(Continued)

*Primary Examiner* — Kevin M Nguyen
(74) *Attorney, Agent, or Firm* — Muirhead and Saturnelli, LLC

(57) ABSTRACT

A mobile communication terminal includes detection means that detects at least one of the position, orientation, attitude, and motion of a mobile communication terminal. Application program execution means can concurrently perform two direction changing processes different from each other according to two direction parameters by executing an application program, and determines at least one of the two direction parameters based on detection data detected by the detection means. The two direction changing processes are, for example, a visual point moving direction changing process for changing a moving direction of a visual point for viewing an image on a display means and a visual line direction changing process for changing a visual line direction. One of the direction parameters may be determined based on a key operation signal from key operation means.

8 Claims, 13 Drawing Sheets

BASIC ATTITUDE

(56) References Cited

FOREIGN PATENT DOCUMENTS

| | | |
|---|---|---|
| JP | 2000-214988 | 8/2000 |
| JP | 2000-347867 | 12/2000 |
| JP | 2002-169645 | 6/2002 |
| JP | 2002-298160 | 10/2002 |
| JP | 2003-334379 | 11/2003 |
| JP | 2004-005272 | 1/2004 |
| JP | 2004-271671 | 9/2004 |
| WO | WO02/088853 A1 | 11/2002 |
| WO | WO2004/020951 A1 | 3/2004 |

* cited by examiner

BASIC ATTITUDE

MOBILE COMMUNICATION TERMINAL, APPLICATION PROGRAM, IMAGE DISPLAY CONTROL APPARATUS, ELECTRONIC APPARATUS, AND IMAGE DISPLAY CONTROL METHOD

TECHNICAL FIELD

The present invention relates to a mobile communication terminal such as a mobile phone, an application program executable in a mobile communication terminal, an image display control apparatus, an electronic apparatus, and an image display control method.

BACKGROUND ART

Conventionally, as a mobile communication terminal, there is known a mobile phone which executes an application program by using a direction parameter determined based on a key operation signal of a direction key. As such an application program, there is one which determines a direction parameter to be used for a process for changing a moving direction of a virtual fighter plane (virtual object) moving in a virtual game space based on a key operation signal of a direction key operated by a user. As a mobile phone which executes such an application program, there is one capable of executing an application program written in an object-oriented programming language that does not depend on a platform. For example, there is a mobile phone which is implemented with a JAVA (registered trademark, the same applies to the following description) virtal machine function and can execute an application program written in JAVA (refer to Patent Document 1). In such a mobile phone, various application programs acquired by downloading from a predetermined server can be used. The same applies to an application program which works in a BREW (registered trademark, the same applies to the following description) application execution environment.

A mobile phone which executes an application program by using a direction parameter determined based on detection data of detection means is also known. For example, in Patent Document 2, a mobile phone in which a moving direction of the mobile phone is identified by using acceleration detected by a sensor (detection means) that detects acceleration is described. In this mobile phone, based on a moving direction of the mobile phone identified from the results of detection, a moving direction (a direction parameter) of a cursor for selecting one of a plurality of input character candidates displayed on a liquid crystal display is determined and a process for moving this cursor is performed. More specifically, for example, when the mobile phone is moved to the right, according to this moving direction, a process for moving the cursor displayed on the liquid crystal display to the right is performed.

On the other hand, when a three-dimensional stereoscopic image object is displayed on a two-dimensional image screen of the display in a conventional electronic apparatus such as a mobile communication terminal or a portable game machine, it is necessary that an image of the image object viewed from a certain fixed visual point be displayed. Therefore, the control of the visual point for viewing the image object is important for displaying the three-dimensional stereoscopic image object. As a typical image display control of such a three-dimensional stereoscopic image object, there are known (1) control of display for panoramically viewing a stereoscopic image object from a visual point fixed outside the stereoscopic image object and (2) control of display for viewing a surroundings from a subjective visual point provided on a stereoscopic image object, and so on.

Describing by way of example a flight simulator on a home or business-use game machine which controls an airplane as a stereoscopic image object in a three-dimensional space by means of input from an external controller and displays the airplane on a two-dimensional screen, the image display controls of (1) and (2) are performed as follows. For example, (1) is an image display control for displaying an image panoramically capturing the airplane from a visual point fixed at the rear or side of the airplane (stereoscopic image object). The image process of (2) is an image display control in which a subjective visual point directed forward of the airplane from a virtual pilot's seat of the airplane is set, and the screen is always displayed from a visual point forward in the traveling direction even when the traveling direction of the airplane is controlled to change in response to input from an external controller.

In Patent Document 3, image display control capable of changing the visual point for viewing the stereoscopic image object is described. In this control, an image of an imitative field of view in a virtual space from a visual point set in the virtual space toward the visual line direction is displayed on display means. Then, when a user performs a predetermined touch panel operation on a touch panel, in response to the details of the operation, the visual point can be moved, the moving direction thereof can be chanced, or the visual line direction can be changed. Thereby, the position of the visual point and the visual line direction in the virtual space are changed, and the image of the imitative field of view displayed on the touch panel is changed.

Patent Document 1: Japanese Unexamined Patent Application Publication No. 2000-347867
Patent Document 2: Japanese Unexamined Patent Application Publication No. 2002-169645
Patent Document 3: Japanese Unexamined Patent Application Publication No. 2004-5272

As described above, when a process (direction changing process) for changing the moving direction of a virtual fighter plane in response to a direction parameter determined based on a key operation signal of a direction key is performed, concurrently with this process, if a process (direction changing process) for changing the visual line direction from the visual point of the game screen set in the virtual game space can be performed, a game with higher realistic sensation can be provided to the user. However, the direction parameter to be used by the conventional mobile phone for this direction changing process is determined based on only a key operation signal of a direction key, and there is no mobile phone which concurrently performs two direction changing processes different from each other according to two direction parameters. Therefore, it is not possible to provide a game with the above-described higher realistic sensation to users.

If a mobile phone which can perform the two direction changing processes concurrently with each other is realized, this is useful not only for such game application programs but also for various other application programs.

Herein, as a method for making it possible to concurrently perform the two direction changing processes, for example, it is considered that two direction keys are provided in the mobile phone to determine two direction parameters to be used in these two direction changing processes. However, in this method, it is necessary to add another direction key to the conventional mobile phone that has a direction key, and an installation space for the additional direction key must be secured on the outer surface of the mobile phone. Therefore, this results in an increase in size of the mobile phone the downsizing of which has been strongly demanded.

The description above regards a mobile phone by way of example, however, the same can be said for other mobile communication terminals the downsizing of which have been demanded.

In the conventional image display controls of (1) and (2), the operation for changing the visual point and other operations (for example, game operations) are performed by inputting by using keys and a touch panel, so that in nay cases, in terms of convenience in the user's operations, the change in visual point and real operations are alternatively selected by a user. That is, in the case of the aforementioned flight simulator, normally, the airplane is controlled by key inputs, and image display control is performed so that the visual point on the screen is changed after the key input acceptance is switched Such conflict between the operations for changing the visual point and other operations deteriorates the operability of users.

In the case of the image display control of the Patent Document 3, as described above, a user can move the visual point set in a virtual space and change the visual line direction from the visual point by performing operations on a touch panel. However, in this apparatus, operations by the user are operations on the two-dimensional plane called the touch panel, so that only by these operations, only two-dimensional directions on the plane can be determined. Therefore, by these operations, high operability involving intuitive change by a user in three-dimensional direction such as a moving direction of the visual point and the visual line direction in a virtual space cannot be realized.

Accordingly, it would be desirable to provide a mobile communication terminal and an application program which makes it possible to concurrently perform different two direction changing processes in response to an operation by a user without an increase in size of the mobile communication terminal.

It would also be desirable to provide an image display control apparatus, an electronic apparatus, and an image display control method which can realize high operability involving intuitive change by a user in three-dimensional direction such as moving direction of a visual point and visual line direction while avoiding conflict between an operation for changing the visual point in virtual space and other operations.

SUMMARY OF THE INVENTION

A mobile communication terminal according to the present invention includes application program execution means for executing an application program by using direction parameters and detection means for detecting at least one of the position, orientation, attitude, and motion of the mobile communication terminal, wherein the application program execution means can concurrently perform two direction changing processes different from each other according to two direction parameters by executing the application program, and at least one of the two direction parameters is determined based on detection data detected by the detection means.

In this mobile communication terminal, at least one of the direction parameters to be used in two direction changing processes capable of being concurrently performed is determined based on detection data detected by the detection means. Therefore, at least one direction parameter is determined by moving the mobile communication terminal by a user so that at least one of the position, orientation, attitude, and motion thereof changes. The detection means can be provided inside the mobile communication terminal unlike key operation means such as the direction key. Therefore, in comparison with the case where two key operation means are provided for determining the two direction parameters, the mobile communication terminal can be prevented from becoming large in size.

"different two direction changing processes" referred to herein means processes necessary for changing directions of different two objects capable of changing in direction according to two direction parameters in response to execution of an application program.

In the mobile communication terminal, it is preferable that the mobile communication terminal includes display means for displaying an image of an imitative field of view in a virtual space toward a visual line direction from a visual point set in the virtual space, and the two direction changing processes are a visual point moving direction changing process for changing a moving direction of the visual point and a visual line direction changing process for changing the visual line direction.

In this mobile communication terminal, by performing an operation for moving the mobile communication terminal by a user so that at least one of the position, orientation, attitude, and motion thereof changes, either one of the moving direction of the visual point and the visual line direction is changed. This operation is an operation in a three-dimensional space (real space) to move the mobile communication terminal, so that when changing the moving direction of the visual point and the visual line direction in a virtual space indicating the same three-dimensional space, a user can intuitively operate it, so that high operability is realized.

In the mobile communication terminal, the application program execution means determines both of the two direction parameters based on detection data detected by the detection means, and the visual line direction changing process changes the visual line direction so that the visual line direction is maintained toward a virtual object present in the virtual space even if the visual point is moved.

In this mobile communication terminal, the visual point moving direction changing process and the visual line direction changing process can be concurrently performed according to direction parameters determined based on detection data detected by the detection means. The visual line direction changing process is performed so that the visual line direction is maintained toward a virtal object present in the virtual space even if the visual point is moved. Therefore, on the display means, an image of the virtual object is always displayed. In addition, when a user moves the mobile communication terminal, the moving direction of the visual point is changed accordingly, and a relative position of the visual point with respect to the virtual object in the virtual space can be changed. Therefore, the user can confirm the virtal object from his/her desired direction only by performing one operation of moving the mobile communication terminal.

In the mobile communication terminal, it is preferable that the mobile communication terminal includes key operation means including keys to be operated by a user, and the application program execution means determines one of the two direction parameters based on detection data detected by the detection means and determines the other direction parameter based on a key operation signal from the key operation means.

In this mobile communication terminal, one of the two direction changing processes is performed by using a direction parameter determined based on a key operation signal, and the other is performed by using a direction parameter determined based on detection data detected by the detection means. The former direction parameter is determined by a key operation by a user. The latter direction parameter is determined by moving the mobile communication terminal by a user so that at least one of the position, orientation, attitude, and motion thereof changes. The key operation and movement of the mobile communication terminal can be performed concurrently and independently from each other by a user. Therefore, according to this mobile communication terminal, operations for determining the two direction parameters to be used in the two direction changing processes to be concurrently performed can be performed simultaneously and independently from each other.

In the mobile communication terminal, it is preferable that the application program execution means advances the game in which a virtual object moves in a virtual game space by executing the application program, and either one of the two direction changing processes is a process for changing the moving direction of the virtal object in the virtual game space.

In this mobile communication terminal, in response to a key operation or operations for moving the mobile communication terminal by a user, the moving direction of the virtual object in the virtual game space can be changed. On the other hand, among key operations and operations for moving the mobile communication terminal, when a user performs an operation which is not used for changing the moving direction of the virtual object, another direction changing process for changing a changing target direction different from the moving direction of the virtual object can be performed. Therefore, an operation for determining the direction parameters to be used in the process for changing the moving direction of the virtual object and another direction changing process can be performed simultaneously and independently from each other.

In the mobile communication terminal, it is preferable that the application program execution means advances a game in which a virtual object moves in a virtual game space by executing the application program, and the mobile communication terminal includes display means for displaying an imitative field of view in a virtual game space toward a visual line direction from a visual point set in the virtual game space, and either one of the two direction changing processes is a process for changing the moving direction of the visual point or a process for changing the visual line direction.

In this mobile communication terminal, by performing a key operation or performing an operation for moving the mobile communication terminal by a user, the moving direction of the visual point or the visual line direction set in the virtual game space can be changed. By thus changing the moving direction of the visual point and the visual line direction, the imitative field of view in the virtual game space can be changed, and an image to be displayed on the display means can be changed. On the other hand, when a user performs an operation which is not used for changing the moving direction of the visual point or the visual line direction among key operations and operations for moving the mobile communication terminal, another direction changing process for changing a changing target direction different from the moving direction of the visual point and the visual line direction can be performed. Therefore, the direction changing process for changing an imitative field of view in a virtual game space and another direction changing process can be performed simultaneously and independently from each other.

In the mobile communication terminal, it is preferable that the application program execution means advances a game in which a virtual object moves in a virtual game space by executing the application program, and the mobile communication terminal includes display means for displaying an imitative field of view for viewing the inside of the game space from a visual point set in the virtual game space toward a visual line direction, and one of the direction changing processes is a process for changing the moving direction of the visual point, and the other is a process for changing the visual line direction.

In this mobile communication terminal, by performing a key operation or an operation for moving the mobile communication terminal by a user, the moving direction of the visual point set in the virtual game space can be changed. On the other hand, among key operations and operations for moving the mobile communication terminal, when a user performs an operation which is not used for changing the moving direction of the visual point, direction changing process for changing the visual line direction can be performed. Therefore, the direction changing process for changing the moving direction of the visual point in the virtual game space and the direction changing process for changing the visual line direction from the visual point in the virtual game space can be performed simultaneously and independently from each other.

An application program according to the present invention is for making a computer provided in a mobile communication terminal including detection means for detecting at least one of the position, orientation, attitude, and motion of the mobile communication terminal function, wherein the application program can concurrently perform two direction changing processes different from each other according to two direction parameters, and makes the computer function as application program execution means for determining at least one of the two direction parameters based on detection data detected by the detection means.

This application program can make the computer of the mobile communication terminal execute the same processes as those of the application program execution means that the mobile communication terminal has.

This application program may be provided by using a recording medium such as an FD, CD-ROM, etc., on which the program is recorded as digital information or by using a communication network such as a computer network, etc.

An image display control apparatus according to the present invention performs display control for making display means display an imitative field of view for viewing the inside of a virtual space from a visual point set in the virtual space toward a visual line direction, including image changing process means for changing an image of the imitative field of view by performing at least one of visual point changing processes for changing the visual point and visual line direction changing process for changing the visual line direction based on detection data detected by detection means for detecting at least one of the position, orientation, attitude, and motion of an operating body. The change in visual point includes change in moving direction of the visual point and change in moving distance of the visual point.

In this image display control apparatus, by performing an operation for moving an operating body by a user so that at least one of the position, orientation, attitude, and movement changes, at least one of a visual point and a visual line direction from the visual point is changed. This operation is an operation for moving the operating body within a three-dimensional space (real space), so that when changing the movement of the visual point and the visual line direction from the visual point in a virtual space indicating the same three-dimensional space, it becomes possible for a user to intuitively operate it.

An electronic apparatus of the present invention includes display means, image display control means for performing display control for making the display means display an image of an imitative field of view for viewing the inside of a virtual space from a visual point set in the virtual space toward a visual line direction, and detection means for detecting at least one of the position, orientation, attitude, and motion of the electronic apparatus, and includes the above-described image display control apparatus as the image display control means.

In this electronic apparatus, an image of an imitative field of view for viewing the inside of a virtual space from a visual point set in the virtual space toward a visual line direction is displayed on the display means. Then, in response to a user's operation in a three-dimensional space (real space) to move the electronic apparatus so as to change at least one of the position, orientation, attitude, and motion thereof, at least one of the visual point and the visual line in an image of the imitative field of view displayed on the display means is changed. This operation is an operation for moving an operating body in a three-dimensional space (real space), so that when changing the visual point and the visual line direction in a virtual space indicating the same three-dimensional space, the user can intuitively operate it.

In the electronic apparatus, a user's operation in a three-dimensional space (real space) for moving the electronic apparatus so as to change at least one of the position, orientation, attitude, and motion thereof is used for changing the visual point and the visual line direction. Therefore, for changing the visual point and the visual line direction, it is not necessary to use operations on a direction key or operations on a touch panel. Therefore, conflict with other operations using a direction key, etc., can be avoided. The direction key, etc., can be exclusively assigned with operations for operating an image object in the virtual space, so that the division of roles of the change of the visual point and the visual line direction and image object operations can be made clear.

By interlocking an external input of at least one of the position, orientation, attitude and motion of the electronic apparatus with the change of the visual point and the visual line direction in the image of the virtual space displayed on the display means of the electronic apparatus, such operations for changing the visual point and the visual line direction can be provided with interactivity. Particularly, in an electronic apparatus such as a mobile phone, PDA, or portable game machine, by interlocking the attitude change in tilt and acceleration of the electronic apparatus main body with changes in visual point and visual line direction, dynamic image process different from conventionally can be performed.

An image display control method of the present invention performs display control for making image display means to display an image of an imitative field of view for viewing the inside of a virtual space from a visual point set in the virtual space toward a visual line direction, wherein the image of the imitative field of view is changed by detecting at least one of the position, orientation, attitude, and motion of an operating body and performing at least one of visual point changing processes for changing the visual point and visual line direction changing processes for changing the visual line direction based on the detection data.

In this image display control method, by performing an operation by a user for moving an operating body so as to change at least one of the position, orientation, attitude, and motion thereof, at least either one of the visual point and the visual line direction is changed. This operation is an operation of moving the operating body in a three-dimensional space (real space), so that when changing the visual point and the visual line direction in a virtual space indicating the same three-dimensional space, the user can intuitively operate it.

As the mobile communication terminal, there are available mobile phones based on the PDC (Personal Digital Cellular) system, GSM (Global System for Mobile Communications) system, TIA (Telecommunication Industry Association) system, mobile phones standardized according to the IMT (International Mobile Telecommunication)-2000, mobile phones based on TD-SCDMA (MC: Multi Carrier) system as one of the TD-SCDMA (Time Division Synchronous Code Division Multiple Access) system, and phones such as PHS (Personal Handyphone Systems) and car telephones. As this mobile communication terminal, portable mobile communication terminals that have no telephone function such as a PDA (Personal Digital Assistance) may also be used as well as the above-described phones.

Other than the mobile communication terminal, the electronic apparatus may be a personal digital assistance (PDA) or a game machine.

According to the mobile communication terminal and application program of the present invention, without increasing the size of the mobile communication terminal, it becomes possible to concurrently perform two direction changing processes different from each other in response to a user's operation.

According to the image display control apparatus, electronic apparatus, and image display control method of the present invention, in comparison with two-dimensional operations such as operations of a direction key and operations of a touch panel, it becomes possible to change a visual point in a virtual space indicating a three-dimensional space and a visual line direction from the visual point by intuitive operations, so that high operability can be realized. In addition, it is not necessary to use operations of a direction key and operations of a touch panel for changing the visual point and the visual line direction, so that conflict with other operations using the direction key, etc., can be avoided.

DETAILED DESCRIPTION OF VARIOUS EMBODIMENTS

Hereinafter, an embodiment of the present invention will be described with reference to the drawings.

Figure 1:
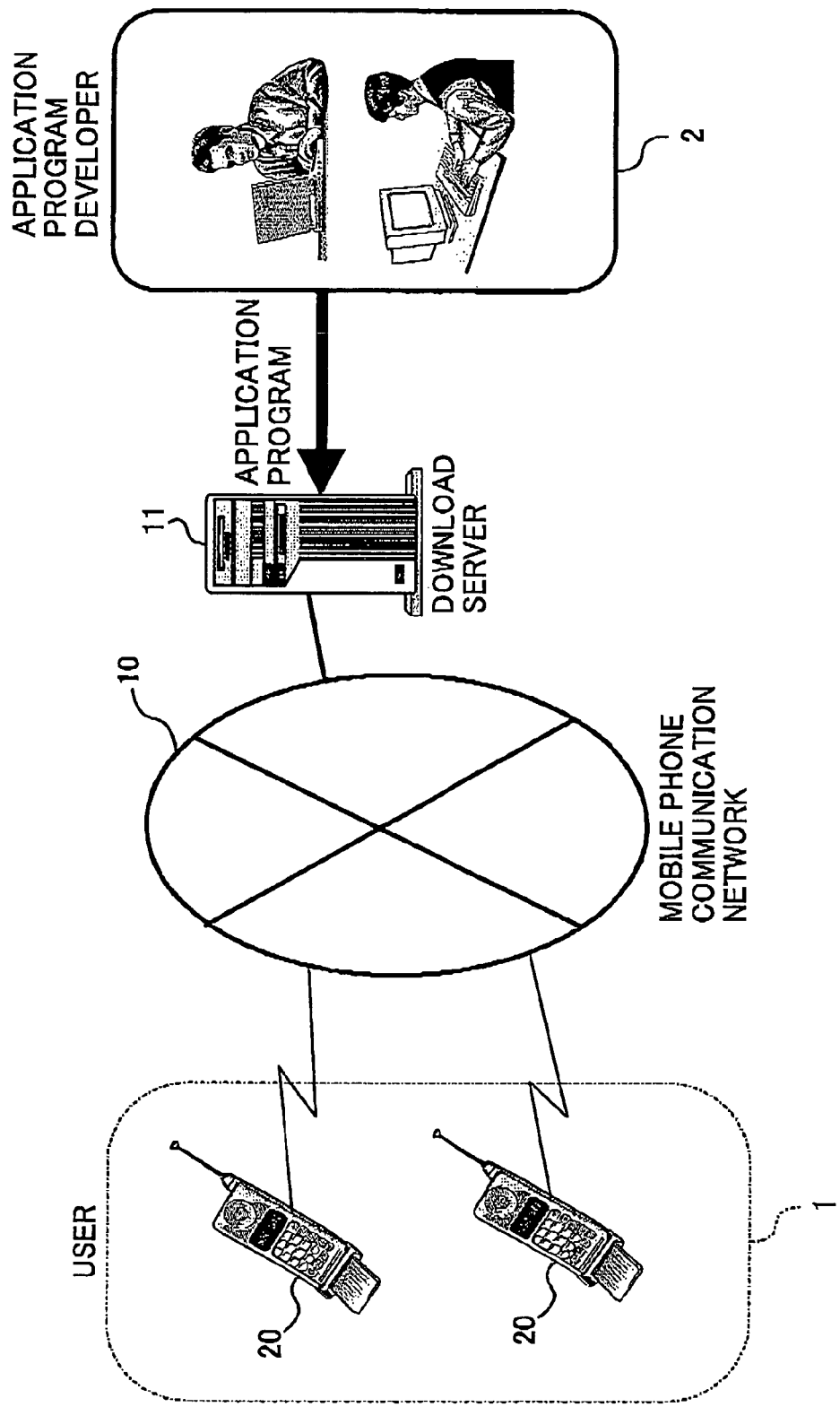
FIG. 1 is an explanatory view for describing an entire configuration of a mobile communication system that a mobile phone can use in the embodiment of the present invention.

FIG. 1 is an explanatory view for describing an entire configuration of a mobile communication system which mobile phones can use according to the present embodiment.

In this mobile communication system, the mobile phone 20 that a user 1 uses has a configuration capable of executing an application program registered by the user 1. In the present embodiment, this application is developed according to object-oriented programming which does not depend on a platform. As such an application program, there are available application programs written in JAVA, and application programs which work in an application execution environment of BREW. This mobile phone 20 is connectable to a mobile phone network 10 as a communication network. To this mobile phone network 10, an application program download server (hereinafter, referred to as "download server") 11 as a program providing server is connected. When this download server 11 accepts a download request from the mobile phone 20, the download server 11 transmits an application program relating to this request to the mobile phone 20.

The application program provided from the download server 11 is provided from a developer 2 of the application program. More specifically, for example, from a personal computer, etc., on the application program developer 2 side, the application program is uploaded to the download server 11 via an exclusive line or public line and provided. It is also possible that a recording medium such as an optical disk or magnetic disk on which the developed application program has been recorded is delivered from the application program developer 2 to a communication carrier who manages and operates the download server 11 and the application program in the recording medium is read by the download server 11 and provided. The thus provided application program is registered on the download server 11 in a state that it can be downloaded into the mobile phone 20 via the mobile phone network 10.

Figure 2:
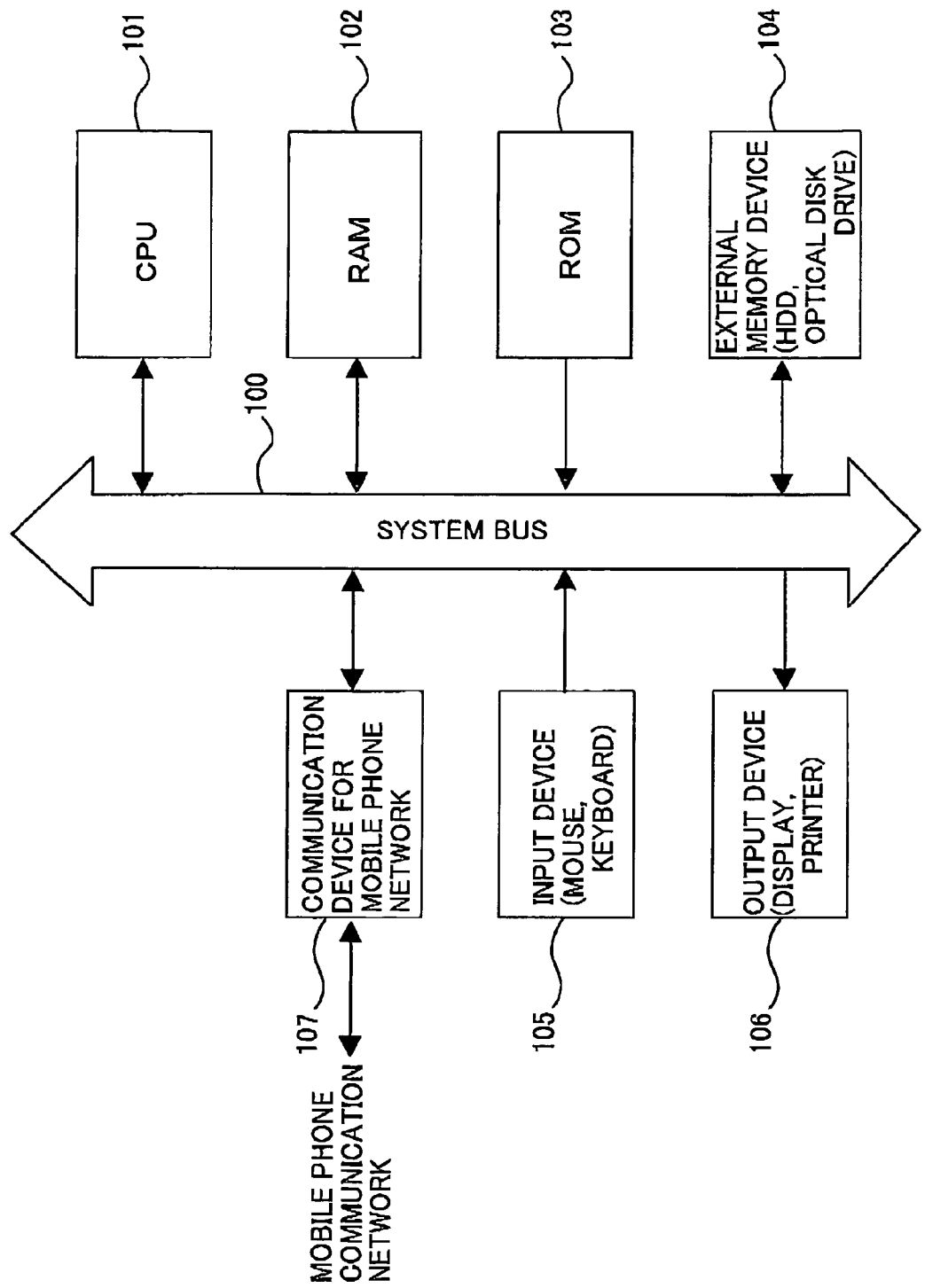
FIG. 2 is a schematic configuration diagram showing hardware configuration of a download server constituting the mobile communication system.

FIG. 2 is a schematic configuration diagram showing hardware configuration of the download server 11.

This download server 11 includes a system bus 100, a CPU 101, an internal memory device, an external memory device 104, an input device 105, and an output device 106. The internal memory device is comprised of a RAM 102 and a ROM 103, etc. The external memory device is comprised of a hard disk drive (HDD) or an optical disk drive, etc. The input device 105 is comprised of the external memory device 104, a mouse, and a keyboard, etc. The output device 106 includes a display and a printer, etc. Furthermore, this download server 11 includes a mobile phone communication device 107 for communicating with the mobile phones 20 of each user 1 via the mobile phone network 10.

Components such as the CPU 101 and the RAM 102 exchange data and program commands, etc., with each other via the system bus 100. A program for operating this download server 11 according to predetermined procedures is memorized in the ROM 103 or the external memory device 104, and is called out to a work area on the CPU 101 and the RAM 102 and executed as appropriate. In this download server 11, the application program to be provided to the mobile phone 20 is memorized in the external memory device 104. The download server 11 has a function for transmitting the application program memorized in the external memory device 104 to the mobile phone 20 via the mobile phone communication network 10 by cooperation of the CPU 101, RAM 102, and communication device 107, etc., for a mobile phone communication network in response to a download request from the mobile phone 20. This download server 11 may be constructed as an exclusive control unit, or may be constructed by using a general-purpose computer system. It may be constructed by one computer, or may be constructed by connecting a plurality of computers having a plurality of functions, respectively, to each other by a network.

Figure 3:
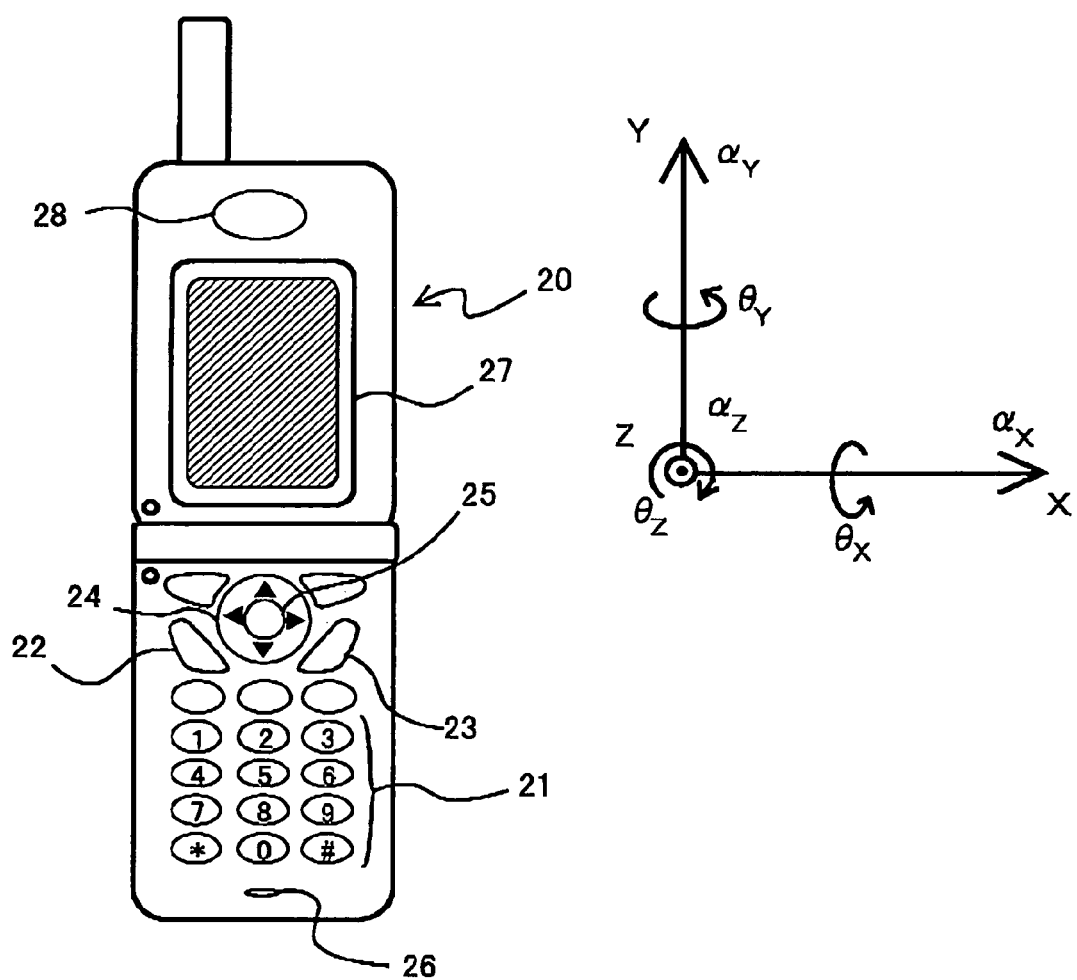
FIG. 3 is a front view showing an external appearance of the mobile phone.
Figure 4:
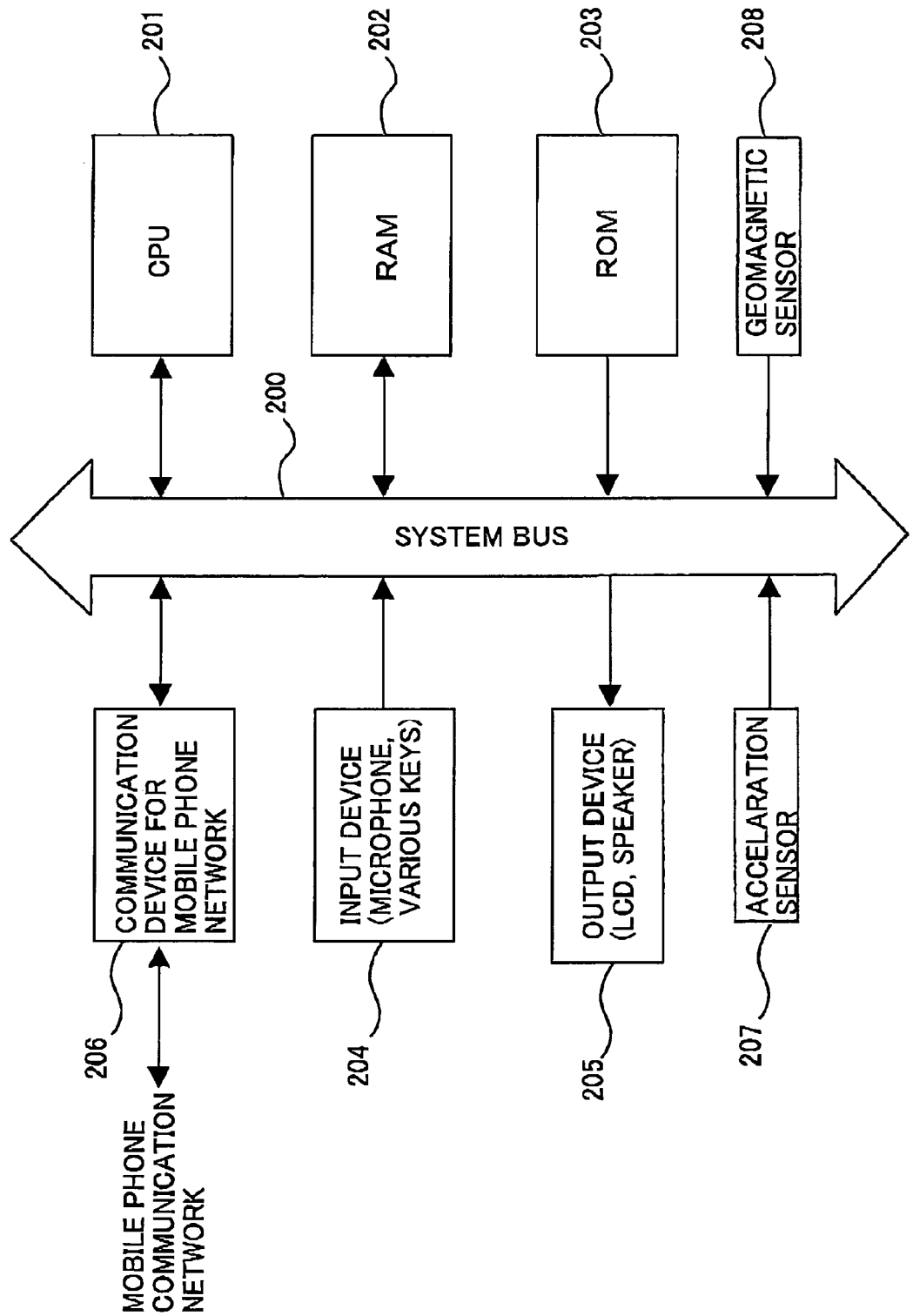
FIG. 4 is a schematic configuration diagram showing hardware configuration of the mobile phone.

FIG. 3 is a front view showing the external appearance of the mobile phone 20, and FIG. 4 is a schematic configuration diagram showing hardware configuration of the mobile phone 20.

This mobile phone 20 is a clam shell (folding) type mobile phone, and includes an internal control device including a system bus 200, a CPU 201, a RAM 202, and a ROM 203, etc., an input device 204, an output device 205, a mobile phone communication device 206, an acceleration sensor 207, and a geomagnetic sensor 208, etc. Components such as the CPU 201 and the RAM 202 exchange various data and program commands described later, etc., with each other via the system bus 200. The input device 204 is comprised of data input keys (numeric keypad, * key, # key) 21, a call start key 22, a call termination key 23, a direction key 24, a multifunction key 25, and a microphone 26, etc. The output device 205 is comprised of a liquid crystal display (LCD) 27 as display means, and a speaker 28, etc. The mobile phone communication device 206 is for communication with other mobile phones or the download server 11 via the mobile phone network 10. In addition, the RAM 202 has a platform memory area as a first memory means to be managed by a phone platform described later and an application memory area as a second memory means to be managed in an application execution environment described later.

The acceleration sensor 207 is a triaxial acceleration sensor for detecting accelerations $\alpha_x$ and $\alpha_y$ in the two directions (the X-axis direction and Y-axis direction in FIG. 3) orthogonal to each other within a plane parallel to the operation surface on which the data input keys are provided and an acceleration $\alpha_z$ in the normal line direction (the Z-axis direction in FIG. 3) of the plane. This acceleration sensor 207 is mounted on a circuit board that is not shown, provided inside the mobile phone 20, and a known sensor capable of detecting the accelerations $\alpha_x$, $\alpha_y$, and $\alpha_z$ can be used. As the acceleration sensor 207, for example, a biaxial acceleration sensor which can detect the accelerations $\alpha_x$ and $\alpha_y$ may be used.

Furthermore, the geomagnetic sensor 208 is a triaxial sensor for detecting magnetic field intensity components (magnetic flux density components) of geomagnetism on a three-dimensional coordinate system consisting of the X-axis, the Y-axis, and the Z-axis. In the present embodiment, by using the detection results performed by this geomagnetic sensor 208, the angles $\theta_X$, $\theta_Y$, and $\theta_Z$ around the X-axis, the Y-axis, and the Z-axis are detected. More specifically, a changing amount of the geomagnetic direction with respect to a reference geomagnetic direction (reference direction) is detected by using the angles $\theta_X$, $\theta_Y$, and $\theta_Z$ around the X-axis, Y-axis, and Z-axis. Thereby, when the mobile phone changes in attitude from a attitude in which the geomagnetic direction is in the reference direction, the changed attitude can be identified from the respective angles $\theta_X$, $\theta_Y$, and $\theta_Z$. In the description given below, the angle $\theta_X$ around the X-axis is referred to as a pitch angle, the angle $\theta_Y$ around the Y-axis is referred to as a roll angle, and the angle $\theta_Z$ around the Z-axis is referred to as a yaw angle. The roll angle $\theta_Y$ referred to herein indicates an angle between a horizontal projection Z-axis on a horizontal plane of the Z-axis and the north direction. Therefore, from this roll angle $\theta_Y$, the direction of the horizontal projection Z-axis of the mobile phone 20 can be recognized. This geomagnetic sensor 208 is also mounted on the circuit board that is not shown, provided inside the mobile phone 20.

The acceleration sensor 207 and the geomagnetic sensor 208 may be constructed as devices separate from the main body of the mobile phone 20. In this case, concerning the acceleration sensor 207 and the geomagnetic sensor 208, an external unit including these sensors 207 and 208 is integrally connected to the main body of the mobile phone 20.

Figure 5:
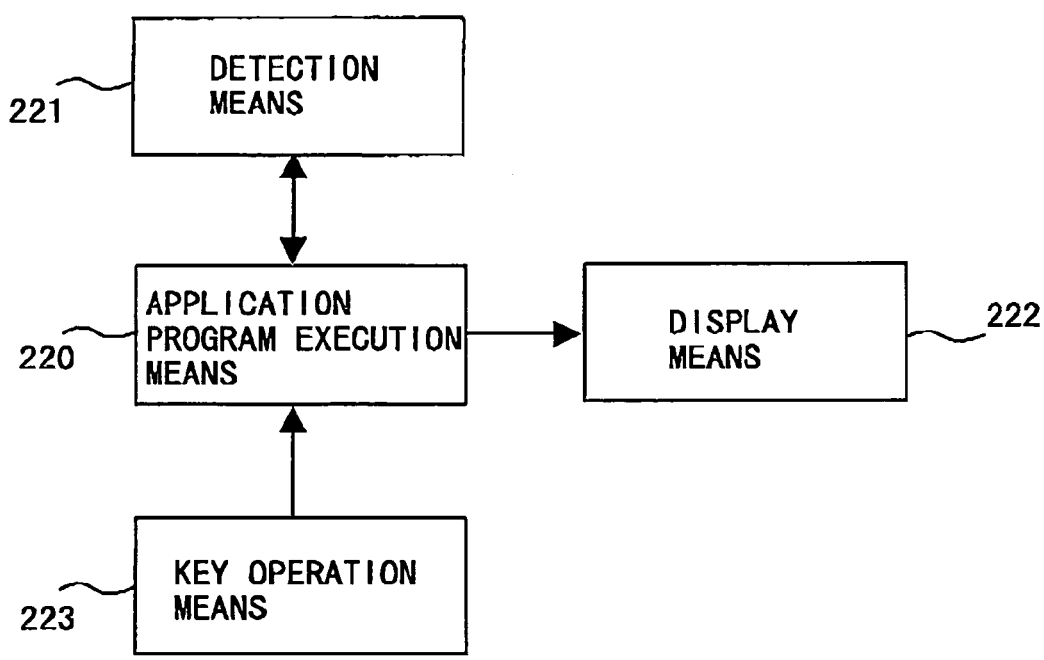
FIG. 5 is a functional block diagram of the mobile phone.
Figure 6:
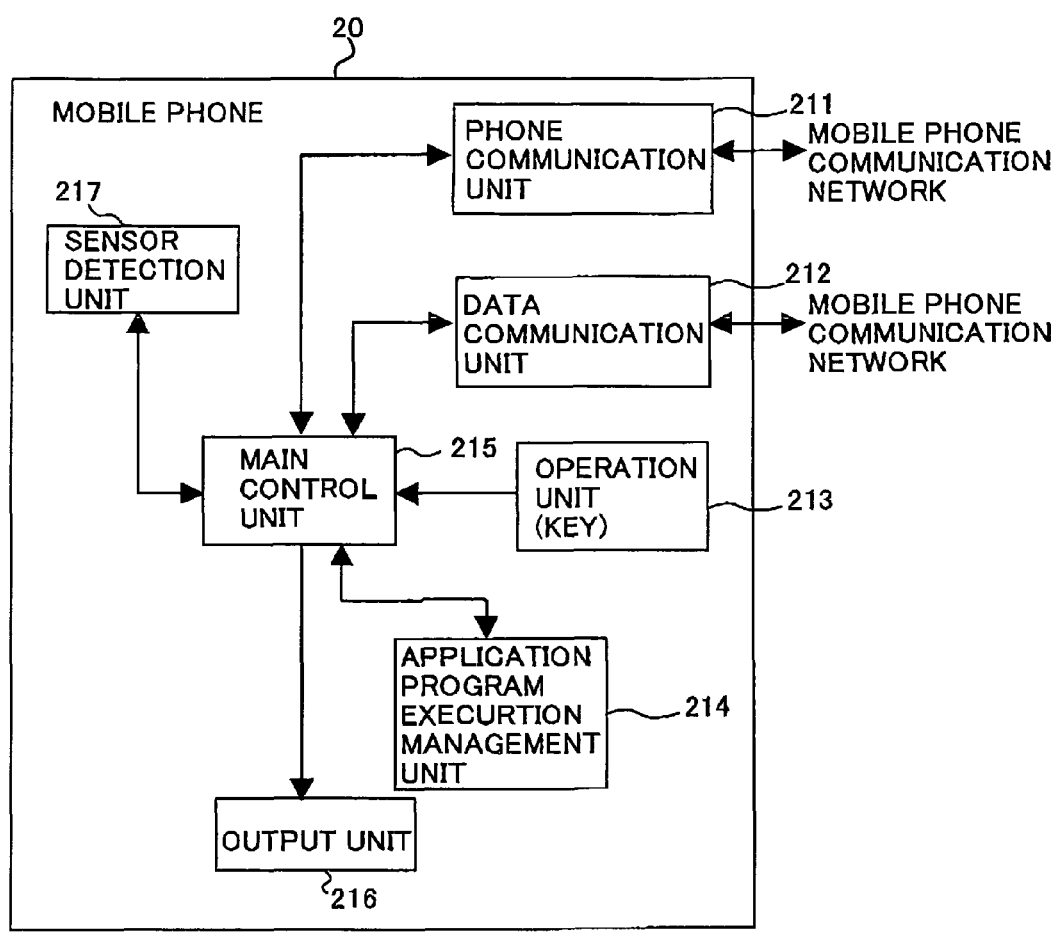
FIG. 6 is a block diagram showing a main configuration of the mobile phone.
Figure 7:
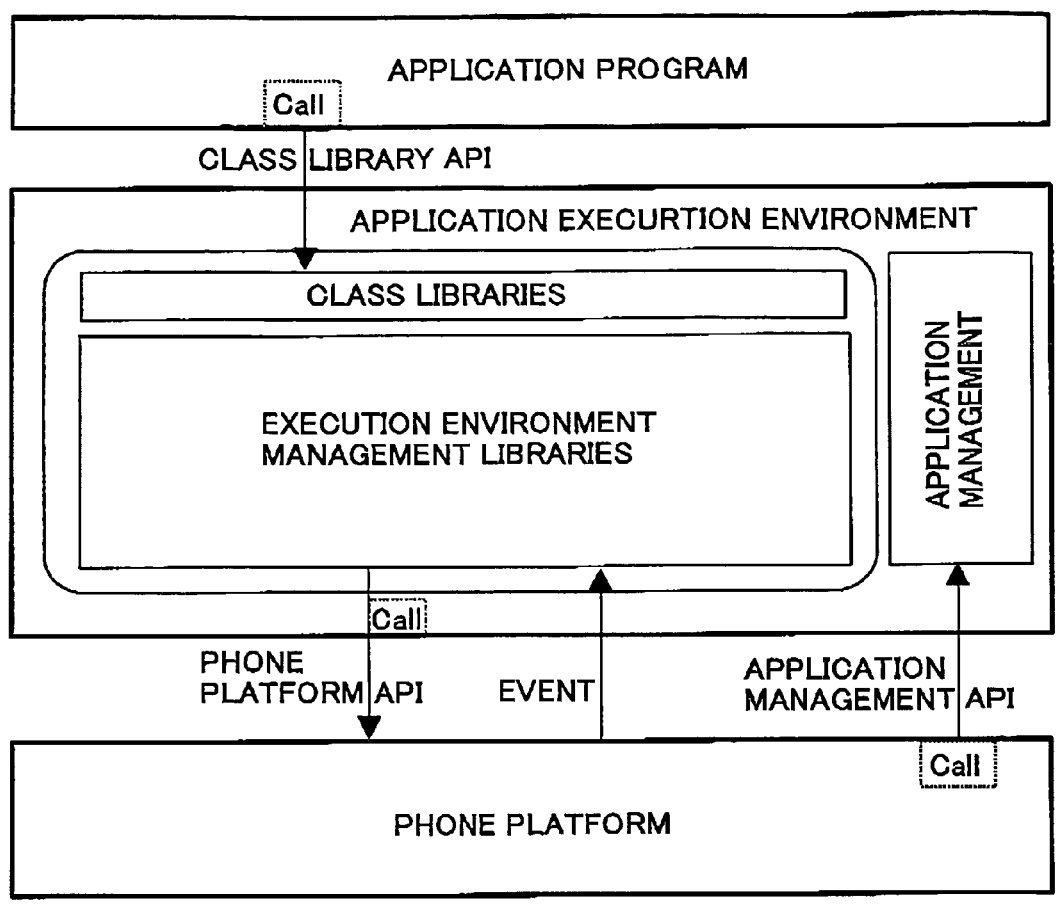
FIG. 7 is an explanatory view of a software structure in the mobile phone.

FIG. 5 is a functional block diagram of the mobile phone 20 according to the present invention. FIG. 6 is a block diagram showing the main configuration of the mobile phone 20, and FIG. 7 is an explanatory view of a software structure in the mobile phone 20.

This mobile phone 20 includes a phone communication unit 211 and a data communication unit 212 as radio communication means, an operation unit 213 as the key operation means 223, an application program execution management unit 214 as the application program execution means 220, a main control unit 215, an output unit 216, a sensor detection unit 217 as the detection means 221, etc.

The phone communication unit 211 is for radio communication with base stations of the mobile phone network 10 to make phone communication with other mobile phones or fixed line phones, and corresponds to a mobile phone communication device 206, etc., on the hardware configuration described above.

The data communication unit 212 corresponds to the mobile phone communication device 206, etc., on the above-described hardware configuration similarly to the phone communication unit 211. This data communication unit 212 is for exchanging mail with other mobile phones via the mobile phone network 10 or for exchanging electronic mail or browsing web pages on the Internet by being connected to an external communication network such as the Internet via a gateway server from the mobile phone network 10. This data communication unit 212 is also used for downloading an application program provided by the download server 11 via the mobile phone network 10.

The operation unit 213 is comprised of the above-described direction key 24, numeric keypad 21, call start key 22, and call termination key 23, etc., to be operated by the user 1. By operating the operation unit 213, a user can input data such as a URL into the mobile phone 20, start or terminate calling when an incoming call is received, and select, start, and stop an application program. In addition, by operating the operation unit 213, a user can download application programs from the download server 11.

The application program execution management unit 214 is comprised of the above-described system bus 200, the CPU 201, and a part of the RAM 202, etc. This application program execution management unit 214 corresponds to an "application execution environment" at the center of the software structure of FIG. 7, provides software such as a class library, an execution environment managing library, and application management to be used for application programs developed according to object-oriented programming, and manages an application program execution environment. This application execution environment is properly selected according to an application program to be executed. For example, when the application program to be executed is written in JAVA, the JAVA application execution environment is selected. When the application program to be executed is a program written in C language which works in a BREW execution environment, the BREW application execution environment is selected. When the application program to be executed is written in JAVA, the JAVA application execution environment is further created on the BREW application execution environment, whereby the application program can be executed.

The application program can be used by calling a class library of functions, etc., in the application execution environment via a class library API (application interface). The calling history of the class library of functions, etc., is memorized in an application memory area in the RAM 202 until the virtual execution environment (virtual machine: VM) of the application program is ended. Also, in the application execution environment, various data to be used for the application execution program is also stored in the application memory area. When the various data are used, they are read out from and written on this application memory area. The execution environment management library in the application execution environment can be used by calling a phone platform library in a phone platform described later via a phone platform API.

In the present embodiment, detection data (accelerations $\alpha_X$, $\alpha_Y$, and $\alpha_Z$, pitch angle $\theta_X$, roll angle $\theta_Y$, and yaw angle $\theta_Z$ detected by the sensor detection unit 217 described later composing the acceleration sensor 207 and the geomagnetic sensor 208, etc., are used in the application program. In a conventional application execution environment, the means for using the detection data in the application program was not provided, so that in the present embodiment, a new class (orientation class) is added to the class library. In this orientation class, methods as command sets including getXGravity( ), getYGravity( ), and getZGravity( ) for acquiring data of the accelerations $\alpha_X$, $\alpha_Y$, and $\alpha_X$ and getPitch( ), getRoll( ), and getCompassBearing( ) for acquiring data of the pitch angle $\theta_X$, roll angle $\theta_Y$, and yaw angle $\theta_Z$, etc., are prepared. Therefore, according to the present embodiment, the application program can acquire the detection data by using these methods and use the data.

The main control unit 215 controls the phone communication unit 211, the data communication unit 212, the output unit 216, and the sensor detection unit 217, and is comprised of the above-described system bus 200, the CPU 201, and the RAM 202, etc. This main control unit 215 exchanges control commands and various data with the application program execution management unit 214, and performs controlling in cooperation with it. The main control unit 215 corresponds to the "phone platform" on the lowest side of the software structure of FIG. 7, and executes a control program for controlling the phone communication unit 211, etc., and a user interface, and provides a phone platform library. This phone platform enables execution of various execution environment processes in the application execution environment and calling and use of software of application management in the application execution environment via the application management API. When the application execution environment calls the phone platform library via the phone platform API and uses it, the phone platform executes a process corresponding to the phone platform library. For example, the phone platform reads data memorized in a platform memory area managed by the phone platform in the RAM 202 based on an instruction from the application execution environment using the phone platform library and transfers these data into the application memory area.

The output unit 216 is comprised of the output device 205, etc., including the liquid crystal display 27 as the display means 222 and the speaker 28, etc. Further, this output unit 216 displays a web page screen received by the data communication unit 212 on the liquid crystal display 27. The liquid crystal display 27 of this output unit 216 is used for informing a user that the phone communication unit 211 and the data communication unit 212 have received information. More specifically, when the information is received, by the main control unit 215, a receipt informing image is displayed on the liquid crystal display 27 of the output unit 216 or a ring tone is outputted from the speaker 28. Furthermore, during the application execution program which is executed in the application execution environment, this output unit 216 is also used for displaying a menu screen, etc., or outputting music relating to the execution of the program.

The sensor detection unit 217 is comprised of the acceleration sensor 207 and the geomagnetic sensor 208, etc. This sensor detection unit 217 works under the control of the main control unit 215, and the main control unit 215 acquires the detection data detected by the sensor detection unit. The data of the accelerations $\alpha_X$, $\alpha_Y$, and $\alpha_Z$ and the data of the pitch angle $\theta_X$, roll angle $\theta_Y$, and yaw angle $\theta_Z$ as the detection data are memorized in the platform memory area of the RAM 202 as described above. For example, when the position of the mobile phone 20 changes and generates acceleration, acceleration components thereof in the X-axis direction, the Y-axis direction, and the Z-axis direction are detected by the acceleration sensor 207 constituting the sensor detection unit 217. When the detection data are inputted into the main control unit 215, the main control unit 215 can recognize the accelerations in the X-axis direction, the Y-axis direction, and the Z-axis direction from the detection data. The data of the accelerations $\alpha_X$, $\alpha_Y$, and $\alpha_Z$ are temporarily stored in the platform memory area in the RAM 202 by the main control unit 215.

When the attitude of the mobile phone 20 changes, magnetic field intensity components (magnetic flux density components) after this attitude change are detected by the geomagnetic sensor 208 constituting the sensor detection unit 217. The sensor detection unit 217 calculates the respective angles $\theta_X$, $\theta_Y$, and $\theta_Z$ after change in attitude from detection signals detected by the geomagnetic sensor 208. The data of the respective calculated angles $\theta_X$, $\theta_Y$, and $\theta_Z$ are outputted to the main control unit 215 and temporarily stored in the platform memory area in the RAM 202 by the main control unit 215 in the same manner as in the case of the accelerations $\alpha_X$, $\alpha_Y$, and $\alpha_Z$.

When the orientation of the mobile phone 20 changes, magnetic field intensity components (magnetic flux density components) after this orientation change are detected by the geomagnetic sensor 208 constituting the sensor detection unit 217. The sensor detection unit 217 calculates the yaw angle $\theta_Z$ after the orientation change from detection signals detected by the geomagnetic sensor 208. The data of the calculated yaw angle $\theta_Z$ is also outputted to the main control unit 215 and temporarily stored in the platform memory area in the RAM 202 by the main control unit 215.

As a method for acquiring the data of the accelerations $\alpha_X$, $\alpha_Y$, and $\alpha_Z$ and the angles $\theta_X$, $\theta_Y$, and $\theta_Z$ to be stored in the platform memory area from the sensor detection unit 217 by the main control unit 215, the following methods are available. For example, there is an acquiring method in which the main control unit 215 sends a request to the sensor detection unit 217, and in response thereto, the sensor detection unit 217 outputs the data and the main control unit 215 receives the data. Also, for example, an acquiring method may be employed in which data continuously outputted from the sensor detection unit 217 regardless of receiving of a request is received by the main control unit 215 as appropriate. It is also possible to employ an acquiring method in which the main control unit 215 sends a request to the sensor detection unit 217 in response to a request outputted by the application program via the application program execution management unit 214, and in response thereto, the sensor detection unit 217 outputs data and the main control unit 215 receives the data.

A control program for creating a phone platform to operate the mobile phone 20 according to predetermined procedures is memorized in the RAM 202 and ROM 203. The basic OS (operating system) programs, programs for creating the application execution environment, and application programs are also memorized in the RAM 202 and the ROM 203. These programs are called out to a work area in the CPU 201 and RAM 202 and executed as appropriate.

First Operation Example

Next, an operation example (hereinafter, this operation example will be referred to as 'first operation example') of process according to an application program as a feature of the present invention will be described. In this first operation example, the present invention applied to process operations for executing an application program using the pitch angle $\theta_X$, the roll angle $\theta_Y$, and the yaw angle $\theta_Z$ will be described by way of example. The application program of this first operation example is a flight simulator as a game.

Figure 8:
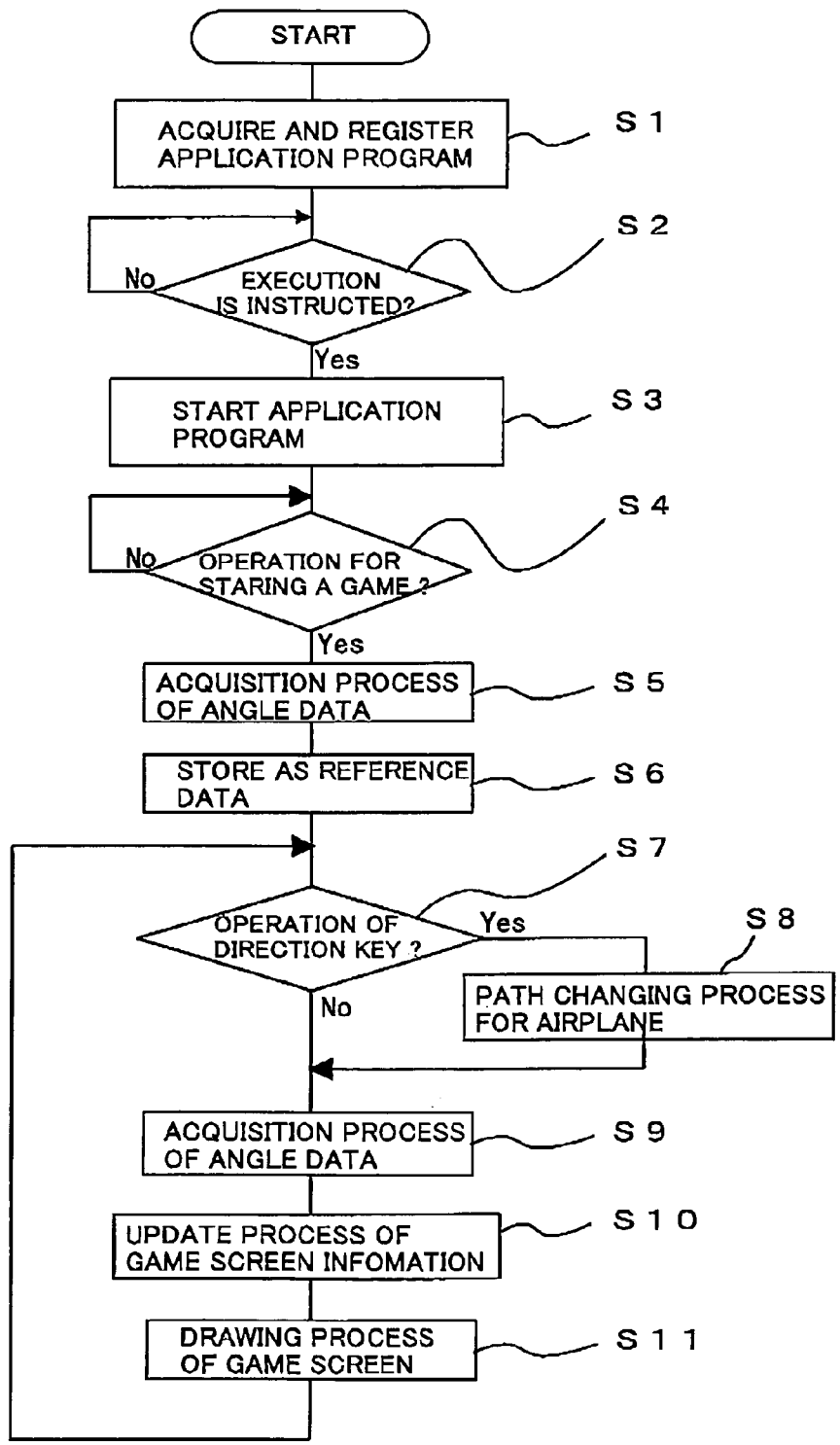
FIG. 8 is a flowchart showing a flow of process for executing an application program in the mobile phone in the first operation example 1.

FIG. 8 is a flowchart showing a flow of process for executing an application program for the flight simulator. First, the user 1 acquires the application program for the flight simulator by downloading from the download server 11, and registers the application program (S1). More specifically, the user 1 accesses the download server 11 by operating the keys of the operation unit 213. Thereby, a download selection screen for selecting a downloadable application program is displayed on the liquid crystal display 27.

In this download selection screen, the application program to be executed is selected by using the direction key 24, and by depressing the multifunction key 25, the main control unit 215 controls the data communication unit 212 and downloads the application program from the download server 11. The thus downloaded application program is memorized in the RAM 102 by the main control unit 215.

In order to execute the downloaded application program, the user 1 makes the liquid crystal display 27 display an application selection screen for selecting the application program to be executed by operating the various keys of the operation unit 213. Then, in this application selection screen, the user selects the application program for the flight simulator to be executed by using the direction key 24 and depresses the multifunction key 25. Then, in the phone platform shown in FIG. 7, that is, in the main control unit 215 shown in FIG. 6, an application program execution instruction is inputted (S2). Thereby, the main control unit 215 reads out the application program for the flight simulator and starts the application program (S3). When the application program starts, in the application execution environment shown in FIG. 7, that is, on the application program execution management unit 214 shown in FIG. 6, the application program works.

When this program starts and the user 1 performs a predetermined operation of various keys of the operation unit 213 for starting the same (S4), the game is started, and a game screen imitating a field of view from a visual point of a pilot seated on a pilot's seat of an airplane (virtual object) in a virtual game space is displayed on the liquid crystal display 27 of the output unit 216. In the initial state, the visual line direction from the visual point is forward in the path direction of the airplane, so that on the game screen, an imitative field of view forward in the path direction of the virtual airplane from the pilot's seat is displayed.

In this flight simulator, two direction parameters including a direction parameter to be determined based on a key operation signal of a direction key 24 and a direction parameter to be determined based on data of a pitch angle $\theta_X$, a roll angle $\theta_Y$, and a yaw angle $\theta_Z$ detected by the sensor detection unit 217 are used to advance the game.

In this first operation example, direction changing process for changing the path direction (moving direction) of the airplane is performed according to the former direction parameter. In this first operation example, the visual point for viewing the image displayed on the game screen is the visual point of the pilot seated on the pilot's seat of the airplane, so that the visual point moves according to movement of the airplane. Therefore, the direction changing process for changing the path direction of the airplane is direction changing process for changing the moving direction of the visual point.

On the other band, concerning the latter direction parameter, direction changing process for changing a visual line direction from the visual point of the pilot is performed according to this direction parameter. Thereby, the visual line direction of the pilot is changed in the virtual game space. That is, in this first operation example, concurrently with changing of the path direction of the airplane in the virtual game space by operating the direction key 24, the user 1 can change the visual line direction of the pilot of the airplane in the virtual game space by performing an operation for changing the attitude of the mobile phone 20 separately.

In this first operation example, when the user 1 performs a predetermined operation for staring the game (S4), the application program execution management unit 214 functions as storage means and stores angle data $\theta_X$, $\theta_Y$, and $\theta_Z$ which the application program acquired first in a reference data memory area (reference data memory means) in an application memory area in the RAM 202 (S5, S6). Based on this reference data, the attitude (basic attitude) of the mobile phone 20 when the user 1 uses the flight simulator is recognized.

After recognizing the basic attitude, the application program execution management unit 214 starts a process for accepting an upper, lower, left, or right key operation signal of the direction key 24 (S7). When the user 1 operates the direction key 24 of the mobile phone 20 for controlling the airplane in the virtual game space, a key operation signal thereof is sent from the operation unit 213 to the application execution management unit 214 via the main control unit 215. The application program execution management unit 214 receives this key operation signal and performs path changing process for the airplane (S8). In this path changing process, for example, when the user 1 presses the upper side of the direction key 24 of the mobile phone 20, in response to a key operation signal thereof, the nose of the airplane in the virtal game space turns vertically downward, and accordingly, the game is advanced so that the path of the airplane is changed vertically downward. For example, when the user 1 presses the left side of the direction key 24 of the mobile phone 20, in response to a key operation signal thereof, the airplane in the virtual game space rolls to the left, and thereby, the game is advanced so that the path of the airplane is changed to the left from the path direction front side.

The application program execution management unit 214 also performs a process for updating game screen information for making the liquid crystal display 27 display the game screen according to this game advance (S10). More specifically, the game screen is changed so that the path of the airplane in the virtual game space is changed. For example, when the user 1 presses the upper side of the direction key 24 of the mobile phone 20, the game screen information is updated so that a field of view from the pilot seat is reproduced as if the path of the airplane is changed vertically downward on the game screen. Thereafter, a process for drawing the updated game screen on the display surface of the liquid crystal display 27 is executed (S11).

On the other hand, after recognizing the basic attitude, the application program execution management unit 214 acquires a pitch angle $\theta_X$, a roll angle $\theta_Y$, and a yaw angle $\theta_Z$ detected by the sensor detection unit 217 substantially in real time (S9). Then, when the user 1 changes the attitude of the mobile phone 20 for changing the visual line direction of the pilot in the virtual game space, the attitude change is detected by the geomagnetic sensor 208 of the sensor detection unit 217, and the data of the angles $\theta_X$, $\theta_Y$, and $\theta_Z$ are delivered to the application program execution management unit 214. The application program execution management unit 214 performs a process for updating the game screen information for making the liquid crystal display 27 display the game screen according to the delivered angle data (S10). More specifically, a process is performed so as to obtain a game screen in which the visual line direction of the pilot of the airplane in the virtual game space is changed. In greater detail, the application program execution management unit 214 which executes the application program calculates the difference between the data of the angles $\theta_X$, $\theta_Y$, and $\theta_Z$ acquired at S9 and the basic attitude data $\theta_{X0}$, $\theta_{Y0}$, and $\theta_{Z0}$ memorized in the application memory area. Herein, for example, it is assumed that the mobile phone 20 was rotated to the left around the Z-axis. In this case, only the yaw angle $\theta_Z$ changes from the basic attitude. By calculating a difference between the data of the yaw angle $\theta_Z$ at this time and the basic attitude data $\theta_{Z0}$, the degree of angle of the rotation of the Y-axis of the mobile phone 20 to the left around the Z-axis from the basic attitude can be recognized. Then, the application program execution management unit 214 scrolls the game screen to the right according to the recognized rotation direction and angle of rotation, and updates the game screen information as if the visual line direction of the pilot was changed leftward. Thereafter, a process for drawing the updated game screen on the display surface of the liquid crystal display 27 is executed (S11).

As described above, in this first operation example, when the user operates the direction key 24 without changing the attitude of the mobile phone 20, in response to a key operation signal thereof, the path direction of the airplane in the virtual game space is changed. According to this change in path direction, the moving direction of the visual point of the pilot moving according to the movement of the airplane is also changed. In this case, the visual line direction of the pilot seated on the pilot's seat of the airplane in the virtual game screen is maintained forward of the path direction. Therefore, on the game screen, a field of view from the visual point of the pilot directed forward of the path direction is displayed.

When the user changes the attitude of the mobile phone 20 without operating the direction key 24, according to the detected angle data, the visual line direction of the pilot in the virtual game space is changed. In this case, while the path direction of the airplane in the virtual game space is maintained, a field of view of the pilot viewing toward a direction different from the path direction, that is, for example, a direction turned by 90 degrees to the horizontal direction from the path direction is displayed on the game screen.

When the user changes the attitude of the mobile phone 20 while operating the direction key 24, according to a key operation signal thereof, the path direction of the airplane in the virtual game space is changed, and at the same time, the visual line direction of the pilot in the virtual game space is changed according to detected angle data. In this case, the game screen information is updated so that both of the visual point and the visual line direction in the virtual game space are changed (S10), and a process for drawing the updated game screen on the display surface of the liquid crystal display 27 is executed (S11).

In this first operation example, the attitude of the mobile phone 20 is recognized by using the pitch angle $\theta_X$, the roll angle $\theta_Y$, and the yaw angle $\theta_Z$ detected by the geomagnetic sensor 208 of the sensor detection unit 217, however, it is also possible that the attitude of the mobile phone 20 is recognized by using three accelerations $\alpha_X$, $\alpha_Y$, and $\alpha_Z$ detected by the acceleration sensor 207. That is, by detecting gravity acceleration by the acceleration sensor 207, the accelerations $\alpha_X$, $\alpha_Y$, and $\alpha_Z$ become gravity acceleration components concerning the X-axis, the Y-axis, and the Z-axis, respectively. From these gravity acceleration components, the attitude of the mobile phone 20 in the gravity directions can be recognized.

In this first operation example, the direction parameter to be determined based on a key operation signal of the direction key 24 and the direction parameter to be determined based on angle data can be interchanged. That is, it is possible that the visual line direction of the pilot in the virtual game space is changed by an operation on the direction key 24, and the path direction of the airplane, that is, the moving direction of the visual point of the pilot in the virtual game space is changed by means of the attitude of the mobile phone 20.

Second Operation Example

Next, in the flight simulator described in the first operation example, a process for selecting a model of the airplane to be used in the came before the game starts will be described.

Figure 9:
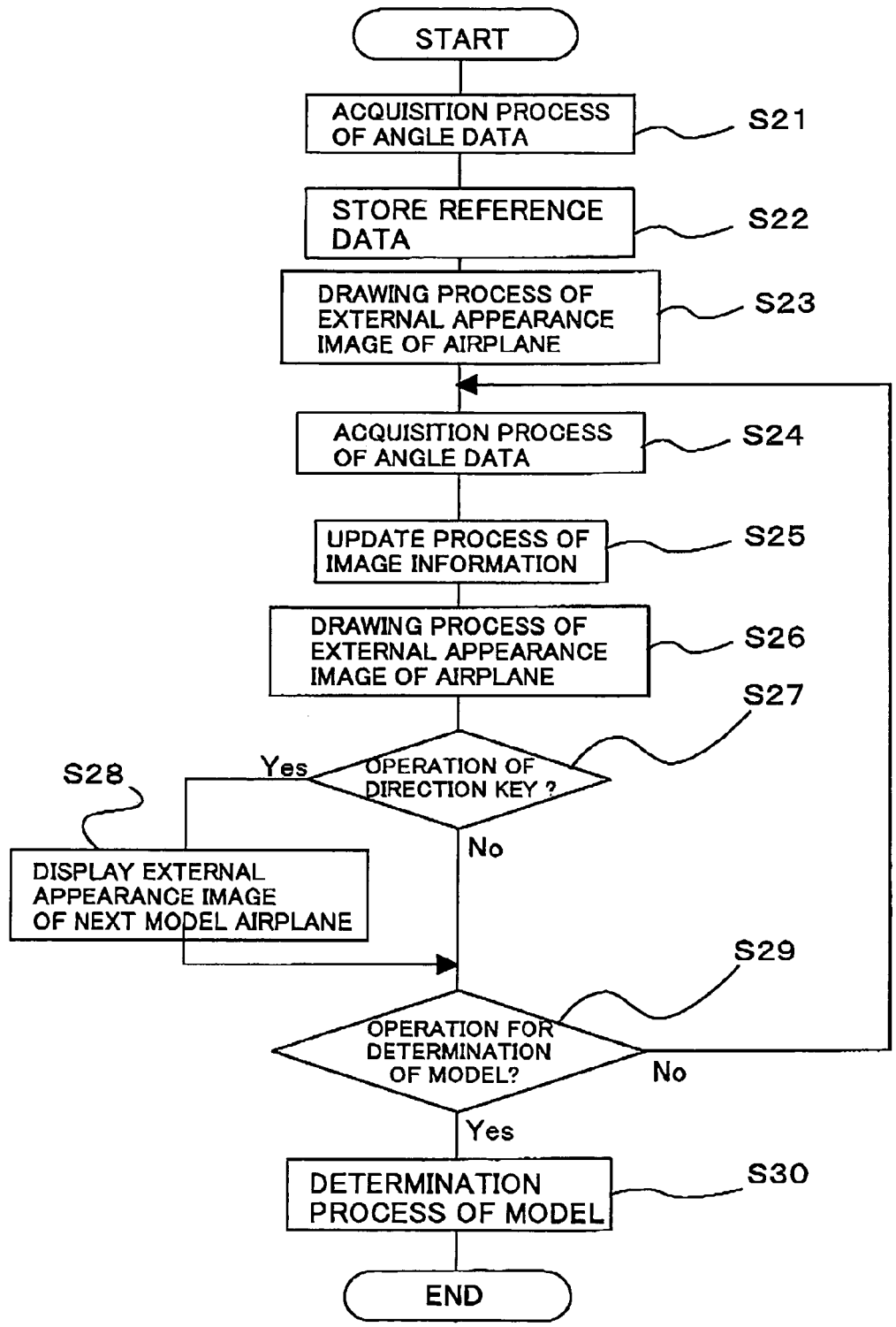
FIG. 9 is a flowchart showing a flow of model selection process in a second operation example in the same mobile phone.

FIG. 9 is a flowchart showing a flow of model selection process in this second operation example.

After the program starts, when a user performs not an operation for starting the game but an operation on the operation unit 213 for model selection process, a process for acquiring the angle data $\theta_X$, $\theta_Y$, and $\theta_Z$ is performed (S21). Then, among the acquired angle data $\theta_X$, $\theta_Y$, and $\theta_Z$, the data of the roll angle $\theta_Y$ is stored as reference data in the RAM 202 (S22). As described above, from this roll angle $\theta_Y$, the direction of the horizontal projection Z-axis of the mobile phone 20 can be recognized. Then, the front direction of the user and the horizontal projection Z-axis direction normally correspond with each other, so that from this roll angle $\theta_Y$, the front direction that the user faces can be recognized. In this second operation example, the attitude when the roll angle $\theta_Y$ matches with the reference data and the normal line direction (substantially Z-axis direction) of the display surface of the liquid crystal display is in the horizontal direction is recognized as a basic attitude. When the mobile phone 20 is in this basic attitude, on the liquid crystal display 27 of the output unit 216, an external appearance image of a first airplane (virtual object) present in the virtual space from the front side is displayed (S23). This external appearance image displayed on the liquid crystal display 27 is an image of an imitative field of view for viewing the inside of the virtual space from a visual point set in the virtual space toward the visual line direction.

Figure 10A:
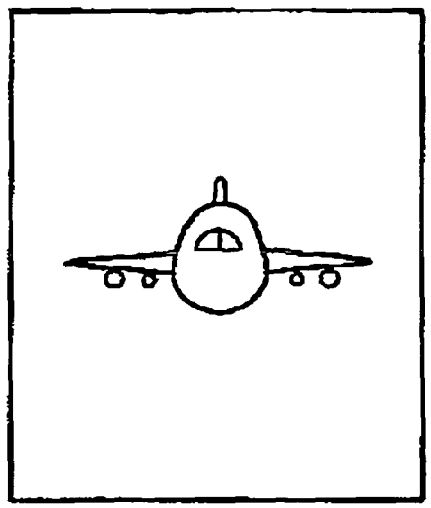
FIG. 10A is an explanatory view showing a relationship between the mobile phone in a basic attitude and an external appearance image of an airplane in a virtual space displayed on the liquid crystal display.
Figure 10A:
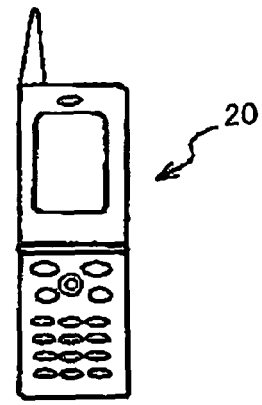
Figure 10B:
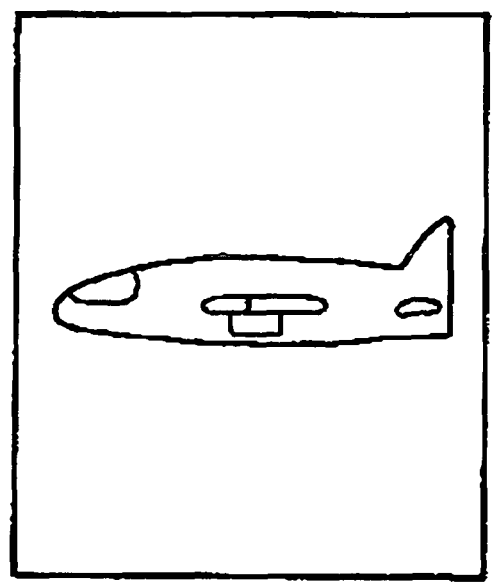
FIG. 10B is an explanatory view showing a relationship between the mobile phone after being changed in attitude and an external appearance image of the airplane in the virtual space displayed on the liquid crystal display.
Figure 10B:
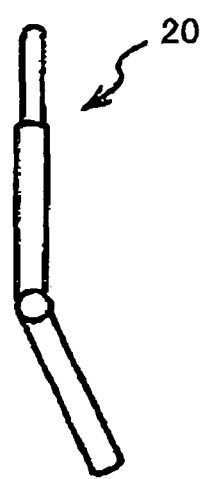

Herein, it is assumed that the user changed his/her orientation by 90 degrees counterclockwise while holding the mobile phone 20 in the basic attitude. At this time, the mobile phone 20 changes into a attitude in which the normal line direction (substantially Z-axis direction) of the display surface of the liquid crystal display 27 rotated by 90 degrees around the vertical direction as a rotation axis from the basic attitude shown in FIG. 10A. The application program execution management unit 214 can recognize this change from the angle data $\theta_X$, $\theta_Y$, and $\theta_Z$ (S24). Then, the application program execution management unit 214 concurrently performs visual point moving direction changing process for changing the moving direction of the visual point and visual line direction changing process for changing the visual line direction from the visual point based on the acquired angle data $\theta_X$, $\theta_Y$, and $\theta_Z$ and the reference data, and performs image information updating process (S25). More specifically, along a surface of a virtual ball regulated so as to have a center set to the central point of the airplane in the virtual space, the visual point is moved toward a position facing the left side surface of the airplane. During this movement, the visual line direction from the visual point is changed so as to always turn toward the central point of the airplane. Then, a process for drawing an imitative field of view for viewing the inside of the virtual space from the visual point at this position toward the visual line direction, that is, the external appearance image of the left side surface of the airplane as shown in FIG. 10B on the liquid crystal display 27 is performed (S26).

Figure 10C:
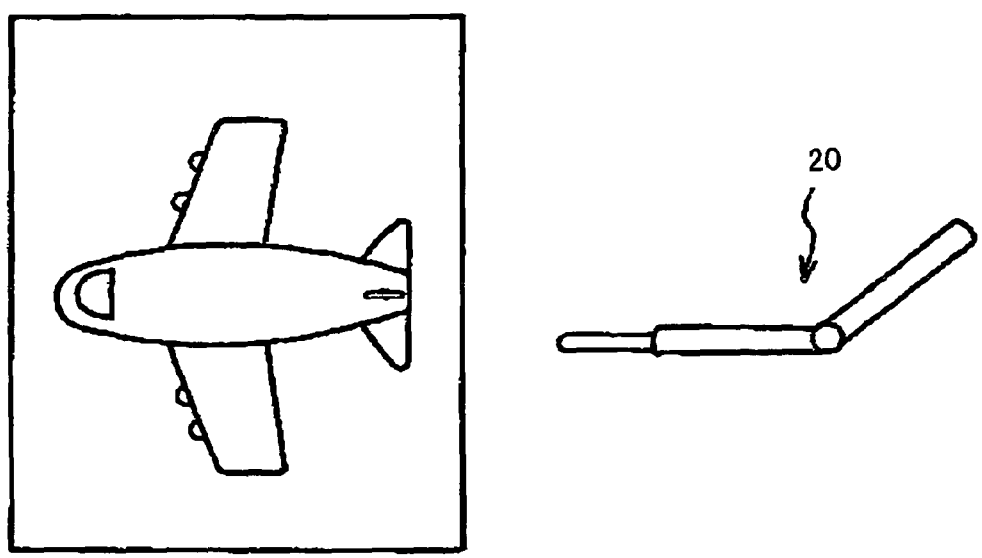
FIG. 10C is an explanatory view showing a relationship between the mobile phone after further being changed in attitude and an external appearance image of the airplane in the virtual space displayed on the liquid crystal display.

Thereafter, it is assumed that the user changed the attitude of the mobile phone 20 by rotating the mobile phone 20 by 90 degrees toward a direction of tilting the antenna of the mobile phone 20 to the deeper side from the user. The application program execution management unit 214 can recognize this change based on angle data $\theta_X$, $\theta_Y$, and $\theta_Z$ (S24). Then, this application program execution management unit 214 performs image information updating process based on the acquired angle data $\theta_X$, $\theta_Y$, and $\theta_Z$ and reference data (S25). More specifically, along the surface of the virtual ball, the visual point is moved toward a position facing the upper surface of the airplane. Also during this movement, the visual line direction from this visual point is changed so as to always turn toward the position facing the center point of the airplane. Then, drawing process for drawing an imitative field of view viewing the inside of the virtual space from the visual point at this position toward the visual line direction that is, the external appearance image of the upper surface of the airplane as shown in FIG. 10C on the liquid crystal display 27 is performed (S26).

The series of processes (S24, S25, and S26) for updating image information based on acquired angle data $\theta_X$, $\theta_Y$, and $\theta_Z$ and drawing it are performed in series. Therefore, when selecting an airplane to be used in the flight simulator, a user can freely confirm the external appearance thereof from 360-degree directions by performing operations for moving the mobile phone 20 so as to change its attitude.

When the user operates the direction key 24 (S27), in response to a key operation signal thereof, an external appearance image of an airplane of another model prepared next is displayed (S28). The user can also freely confirm the external appearance of the airplane of another model from 360-degree directions by performing operations for moving the mobile phone 20 so as to change its attitude.

When the user finds his/her favorite airplane by thus confirming the external appearances of various airplanes, the user depresses the multifunction key 25 in a state that the external appearance of this airplane is displayed on the liquid crystal display 27 (S29). Then, data for identifying the model of this airplane is memorized in a used model memory area in the RAM 202 (S30). Thereafter, when the user performs a predetermined operation of various keys of the operation unit 213 for starting the game, a flight simulator game using an airplane of the model identified from the data memorized in the used model memory area is started.

In this second operation example, model selection process for an airplane to be used in the flight simulator is described by way of example, and the case described is that the image display control device which performs display control to display an image of an imitative field of view viewing the inside of a virtual space from a visual point set in the virtual space toward a visual line direction is the mobile phone 20 having the application program execution management unit 214 as image changing process means. However, the image display control device which has image changing process means for changing the image of the imitative field of view by performing at least one of visual point changing process for changing a moving direction of the visual point and visual line direction changing process for changing the visual line direction based on detection data detected by detection means for detecting at least one of the position, orientation, attitude, and motion of an operating body as described in this second operation example, is not limited to the mobile phone, and may be other mobile communication terminals or a general-purpose computer such as a personal computer as long as it has the image changing process means.

In this second operation example, the case described is that the operating body is a mobile phone itself that is an image display control device, however, the operating body may be separate from the image display control device. In this case, an operating body including the sensor detection unit 217 installed inside is connected to the mobile phone 20 or other image display control devices in a manner enabling wired communication or wireless communication between these. Particularly, when the display means such as the liquid crystal display and the image display control device are integrally formed, by providing an operating body separately from these, it is not necessary for a user to move the integrated device when moving the operating body. Therefore, the display means can be increased in size, and the image of the imitative field of view can be viewed on a large-sized screen.

Third Operation Example

Next, process operations (hereinafter, referred to as 'Third operation example') for executing an application program using the accelerations $\alpha_X$, $\alpha_Y$, and $\alpha_Z$ will be described The application program of this third operation example is for making the mobile phone 20 to work as a mouse that is a pointing device of a portable personal computer such as a notebook computer or a PDA, etc. Of course, the mobile phone can also be made to work as a pointing device of a desktop personal computer.

Figure 11:
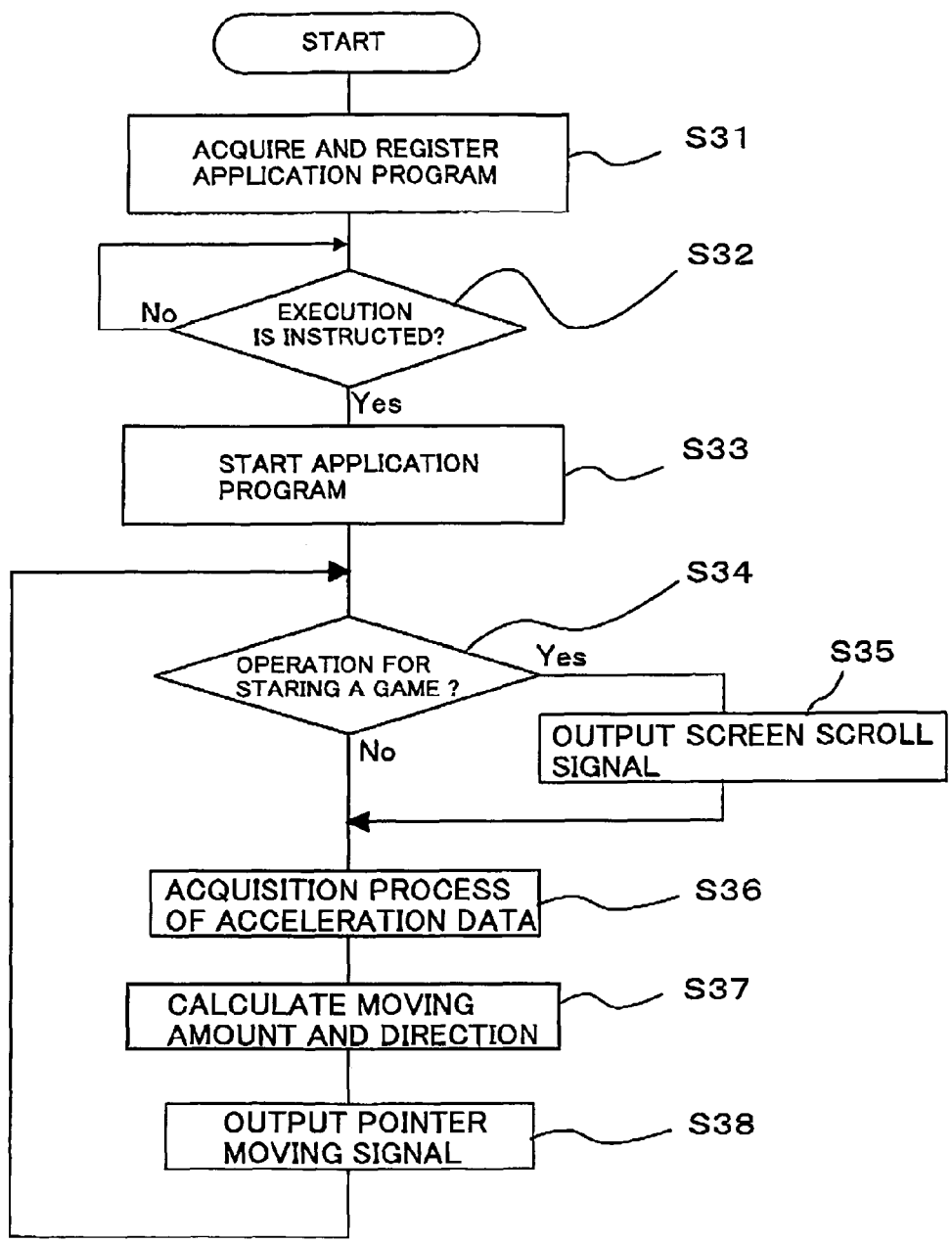
FIG. 11 is a flowchart showing a flow of process for executing an application program in a third operation example in the same mobile phone.

FIG. 11 is a flowchart showing a flow of process for executing the application program in the third operation example.

First, the user 1 acquires the application program for a mouse in the same manner as in the case of the first operation example and registers this (S31). To execute this application program, first, a user 1 connects a USB (Universal Serial Bus) terminal that is not shown of the mobile phone 20 and a USB terminal of the notebook computer or the like. A connection method of this embodiment is a wired connection using USB terminals, however, a method using other wired connections or wireless connections may also be used. Communication means of the mobile phone 20 side to be used for connecting this mobile phone 20 to the notebook computer or the like is not limited to the USB terminals, and various communication means which enable data communication with the notebook computer or the like can also be used. After connecting the mobile phone 20 and the notebook computer or the like, the user 1 operates a key of the operation unit 213 (S32) to start the application program for a mouse (S33).

After the application program for a mouse starts, the application program execution management unit 214 starts a process for accepting an upper, lower, left, or right key operation signal of the direction key 24 in real time (S34). When the user 1 operates the direction key 24 of the mobile phone 20 to scroll the screen of the notebook computer or the like in a predetermined direction, a key operation signal thereof is sent from the operation unit 213 to the application program execution management unit 214 via the main control unit 215. The application program execution management unit 214 receives this key operation signal and executes direction changing process to output a screen scroll signal indicating the screen scroll direction from the external terminal to the notebook computer or the like (S35). Thereby, in the control unit of the notebook computer or the like, a process for scrolling the screen in the direction indicated by the screen scroll signal is performed.

On the other hand, after the application program for a mouse starts, the application program execution management unit 214 acquires data of accelerations $\alpha_X$, $\alpha_Y$, and $\alpha_Z$ detected by the sensor detection unit 217 substantially in real time. Then, the application program execution management unit 214 determines a moving distance and a moving direction (direction parameters) of the mobile phone 20 based on the acquired data. These moving distance and moving direction are outputted to the notebook computer or the like via the external terminal of the mobile phone 20 in series at predetermined short time intervals. In this third operation example, the data of the acceleration $\alpha_Z$ is not used.

More specifically, in an application execution environment, the application program that has started sends an acceleration data acquiring request to the application program execution management unit 214. The application program execution management unit 214 receives this and sends an acceleration data acquiring request as a data transfer command to the main control unit 215 of a phone platform. The main control unit 215 receives this and sends the data of the accelerations $\alpha_X$, $\alpha_Y$, and $\alpha_Z$ memorized in the platform memory area in the RAM 202 to the application program execution management unit 214, and these data are delivered to the application program (S36). The data of the accelerations $\alpha_X$ and $\alpha_Y$ are memorized in the application memory area in the RAM 202. The moving distance and the moving direction of the mobile phone 20 are calculated from the data of these accelerations $\alpha_X$ and $\alpha_Y$ (S37), and direction changing process for outputting a pointer moving signal indicating the moving distance and the moving direction from the external terminal to the notebook computer or the like is executed (S38). In this third operation example, when the main control unit 215 receives the acceleration data acquiring request from the application program execution management unit 214, each time the accelerations $\alpha_X$, $\alpha_Y$, and $\alpha_Z$ in the platform memory area are updated, it sends the updated data to the application program execution management unit 214. The application program for a mouse can acquire data of accelerations $\alpha_X$, $\alpha_Y$, and $\alpha_Z$ substantially in real time and output a pointer moving signal indicating the moving distance and the moving direction to the notebook computer or the like. Thereby, in the control unit of the notebook computer or the like, a process for moving a pointer image displayed on the screen thereof toward the moving direction by the moving distance indicated by the pointer moving signal is performed.

According to this third operation example, the mobile phone 20 can be used as a pointing device of a portable personal computer or the like. Generally, the portable personal computer is inferior to a desktop personal computer in operability of a pointing device thereof for downsizing. Therefore, not a few users always carry a so-called external mouse separately from their portable personal computers. In the third operation example, a mobile phone 20 which a general user always carries can be used as an external mouse with a scroll function. Therefore, without carrying around an external mouse as conventionally, operability equivalent to that of a desktop personal computer can be obtained.

In this third operation example, as the application program using the data of the accelerations $\alpha_X$ and $\alpha_Y$, an application program for a mouse is described by way of example, however, the application program is not limited to this.

In the first through third operation examples above, the case where angle data and acceleration data sent from the sensor detection unit 217 are used in an application program which works in an application execution environment created on a phone platform and does not depend on the platform is described, however, the same description is applied to an application program which depends on a platform, that is, directly works on a phone platform.

Preferred embodiments of the present invention are described above, however, various changes can be added to the disclosed embodiments within the scope of the technical matters described in claims without deviating from the scope or spirit of the present invention.

For example, the present invention is also applicable in the same manner to other games as well as the flight simulator described in the first operation example and the second operation example. For example, the present invention is also applicable to a game in which a vi character (virtual object) moves in a game space. In addition, the present invention is also applicable to an application program which is not a game as well as the application program for a mouse described in the third operation example.

The present invention is applicable not only to the above-described mobile phone 20 but also to all mobile communication terminals, and the same effect can be obtained.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A mobile communication terminal, comprising:
   an application program execution unit that executes an application program by using direction parameters; and
   a sensor that detects at least one of position, orientation, attitude, and motion of the mobile communication terminal, and generates detection data; and
   a communication device that connects the mobile communication terminal to a display, wherein the application program execution unit performs two direction changing processes for the display different from each other according to two direction parameters, one of the two direction parameters corresponding to one of the two direction changing processes and the other of the two direction parameters corresponding to the other of the two direction changing processes, wherein the two direction changing processes are performed concurrently and independently from each other, wherein one of the two direction parameters is determined based on the detection data, and wherein the other of the two direction parameters is determined based on an input that is different from the detection data, wherein one of the two direction parameters is sent to the display as an image moving signal to cause movement of an image on the display, and wherein the other of the two direction parameters is sent to the display as a changing target direction signal different from the image moving signal in order to change a field of view displayed on the display.

2. The mobile communication terminal according to claim 1, wherein the field of view on the display is an imitative field of view viewing the inside of a virtual space from a visual point set in the virtual space toward a visual line direction.

3. The mobile communication terminal according to claim 1, further comprising:
   a key operation unit including keys to be operated by a user, wherein the application program execution unit determines one of the two direction parameters based on the detection data detected by the sensor, and determines the other of the two direction parameters based on the input of a key operation signal from the key operation unit.

4. The mobile communication terminal according to claim 1, wherein the mobile communication terminal operates as a pointing device for the display.

5. An application program, stored in a non-transitory computer-readable medium, for making a computer function, the computer being provided in a mobile communication terminal including a sensor that detects at least one of: position, orientation, attitude, and motion of the mobile communication terminal and generates detection data, the application program comprising:
   executable code that performs two direction changing processes, for a display, different from each other according to two direction parameters, one of the two direction parameters corresponding to one of the two direction changing processes and the other of the two direction parameters corresponding to the other of the two direction changing processes, wherein the two direction changing processes are performed concurrently and independently from each other;
   executable code that determines one of the two direction parameters based on the detection data detected by the sensor, and determines the other of the two direction parameters based on an input that is different from the detection data; and
   executable code that outputs signals based on the two direction parameters to the display connected to the mobile communication terminal, wherein one of the two direction parameters is sent to the display as an image moving signal to cause movement of an image on the display, and wherein the other of the two direction parameters is sent to the display as a changing target direction signal different from the image moving signal in order to change a field of view displayed on the display.

6. The application program according to claim 5, wherein the mobile communication terminal operates as a pointing device for the display.

7. The application program according to claim 5, wherein the executable code that determines the two direction parameters determines one of the two direction parameters based on the detection data detected by the sensor, and determines the other of the two direction parameters based on the input of a key operation signal.

8. The application program according to claim 5, wherein the field of view on the display is an imitative field of view viewing the inside of a virtual space from a visual point set in the virtual space toward a visual line direction.

* * * * *